(12) United States Patent
Modi et al.

(10) Patent No.: US 8,400,041 B2
(45) Date of Patent: Mar. 19, 2013

(54) SEGMENTED STATOR ASSEMBLIES HAVING END CAPS

(75) Inventors: Chetan O. Modi, St. Louis, MO (US); Mark Carrier, St. Louis, MO (US); Jason Jurkowski, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 188 days.

(21) Appl. No.: 12/889,763

(22) Filed: Sep. 24, 2010

(65) Prior Publication Data
US 2011/0291519 A1    Dec. 1, 2011

Related U.S. Application Data

(60) Provisional application No. 61/349,576, filed on May 28, 2010.

(51) Int. Cl.
*H02K 3/34* (2006.01)
*H02K 3/52* (2006.01)

(52) U.S. Cl. .................. 310/194; 310/216.008

(58) Field of Classification Search .............. 310/194, 310/215, 216.008
See application file for complete search history.

(56) References Cited

U.S. PATENT DOCUMENTS

| | | | |
|---|---|---|---|
| 5,583,387 A | 12/1996 | Takeuchi et al. | |
| 5,698,923 A | 12/1997 | Scherzinger et al. | |
| 5,729,072 A | 3/1998 | Hirano et al. | |
| 5,786,651 A | 7/1998 | Suzuki | |
| 5,859,486 A | 1/1999 | Nakahara et al. | |
| 6,049,153 A | 4/2000 | Nishiyama et al. | |
| 6,127,753 A | 10/2000 | Yamazaki et al. | |
| 6,177,751 B1 | 1/2001 | Suzuki et al. | |
| 6,219,900 B1 | 4/2001 | Suzuki | |
| 6,226,856 B1 | 5/2001 | Kazama et al. | |
| 6,300,700 B1 | 10/2001 | Nishiyama et al. | |
| 6,359,355 B1 | 3/2002 | Hartsfield et al. | |
| 6,369,687 B1 | 4/2002 | Akita et al. | |
| 6,487,769 B2 | 12/2002 | Ketterer et al. | |
| 6,504,284 B1 | 1/2003 | Kazama et al. | |
| 6,573,632 B2* | 6/2003 | Hsu ............................. | 310/194 |
| 6,658,721 B2 | 12/2003 | Kazama et al. | |
| 6,744,166 B2 | 6/2004 | Harter et al. | |
| 6,856,055 B2 | 2/2005 | Michaels et al. | |

(Continued)

FOREIGN PATENT DOCUMENTS

| JP | 2005-278223 | * 10/2005 |
|---|---|---|
| JP | 2009-183071 A | * 8/2009 |

OTHER PUBLICATIONS

Machine translation of Hasegawa et al. JP 2005-278223, Oct. 2005.*

(Continued)

*Primary Examiner* — Burton Mullins
(74) *Attorney, Agent, or Firm* — Hovey Williams LLP

(57) ABSTRACT

Segmented stator assemblies having a plurality of stator segments and a plurality of end caps are disclosed. According to one example embodiment, a segmented stator assembly includes a plurality of stator segments and a plurality of end caps. Each stator segment has a yoke portion and a tooth portion extending from the yoke portion. Each end cap is positioned over one of the stator segments. Each end cap includes a body portion positioned at least partially over the yoke portion of its associated stator segment. At least one of the body portions includes at least a first post that cooperates with a post of an adjacent end cap to define a first wire management tie-down. The stator assembly further includes a stator wire coupled to the first wire management tie-down. Stator assemblies and end caps having other wire management and routing features are also disclosed.

23 Claims, 10 Drawing Sheets

U.S. PATENT DOCUMENTS

| | | |
|---|---|---|
| 6,941,638 B2 | 9/2005 | Hartsfield, Jr. et al. |
| 6,984,911 B2 * | 1/2006 | Horie et al. .................. 310/194 |
| 7,116,023 B2 | 10/2006 | Wang et al. |
| 7,122,933 B2 | 10/2006 | Horst et al. |
| D539,219 S | 3/2007 | Wang et al. |
| D539,737 S | 4/2007 | Wang et al. |
| 7,340,822 B2 * | 3/2008 | Yamamura et al. ............. 29/598 |
| 7,345,397 B2 | 3/2008 | Sheeran et al. |
| 7,382,075 B2 | 6/2008 | Wang et al. |
| 7,414,347 B2 | 8/2008 | Wang et al. |
| 7,498,709 B2 * | 3/2009 | Shteynberg et al. .......... 310/184 |

OTHER PUBLICATIONS

Machine translation of Yamamoto et al. JP 2009-183071, Aug. 2009.*

* cited by examiner

SEGMENTED STATOR ASSEMBLIES HAVING END CAPS

CROSS-REFERENCE TO RELATED APPLICATION

This application claims the benefit of U.S. Provisional Application No. 61/349,576 filed May 28, 2010, the entire disclosure of which is incorporated herein by reference.

FIELD

The present disclosure relates to segmented stator assemblies for electric machines and, more particularly, to segmented stator assembles having end caps.

BACKGROUND

This section provides background information related to the present disclosure which is not necessarily prior art.

Segmented stators assemblies are commonly used in electric machines and typically include a plurality of annularly disposed stator segments. Each stator segment may be wound with magnet wire individually, or several stator segments may be wound with a single continuous magnet wire (sometimes referred to as chain wound stator segments). The stator segments may include one or more end caps disposed on ends of the segments to insulate the stator segment from the magnet wire. The end caps typically include features for routing and/or terminating the magnet wire(s).

SUMMARY

This section provides a general summary of the disclosure, and is not a comprehensive disclosure of its full scope or all of its features.

According to one aspect of the present disclosure, a segmented stator assembly includes a plurality of stator segments and a plurality of end caps. Each stator segment has a yoke portion and a tooth portion extending from the yoke portion. Each end cap is positioned over one of the stator segments. Each end cap includes a body portion positioned at least partially over the yoke portion of its associated stator segment. At least one of the body portions includes at least a first post that cooperates with a post of an adjacent end cap to define a first wire management tie-down. The stator assembly includes a stator wire coupled to the first wire management tie-down.

According to another aspect of the present disclosure, a segmented stator assembly includes a plurality of stator segments and a plurality of end caps. Each stator segment has a yoke portion and a tooth portion extending from the yoke portion. The plurality of stator segments are annularly disposed and define a central axis. Each end cap is positioned over one of the stator segments. Each end cap includes a body portion positioned at least partially over the yoke portion of its associated stator segment. At least one of the body portions includes an arcuate member having a convex side facing the central axis defined by the plurality of stator segments.

According to yet another aspect of the present disclosure, a segmented stator assembly includes a plurality of stator segments and a plurality of end caps. Each stator segment has a yoke portion and a tooth portion extending from the yoke portion. The plurality of stator segments are annularly disposed and define a central axis. Each end cap is positioned over one of the stator segments. Each end cap includes a body portion positioned at least partially over the yoke portion of its associated stator segment. The body portion includes a wall segment. The stator assembly further includes a stator shell disposed about the annularly disposed stator segments. The stator shell defines a vent hole, and the wall segment is at least partially aligned with the vent hole to inhibit the insertion of a foreign object into the vent hole.

Some example embodiments of segmented stator assemblies (and related methods and electric motor assemblies) incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 7A-G illustrate an end cap according to another example embodiment of the present disclosure.

Figure 7A:
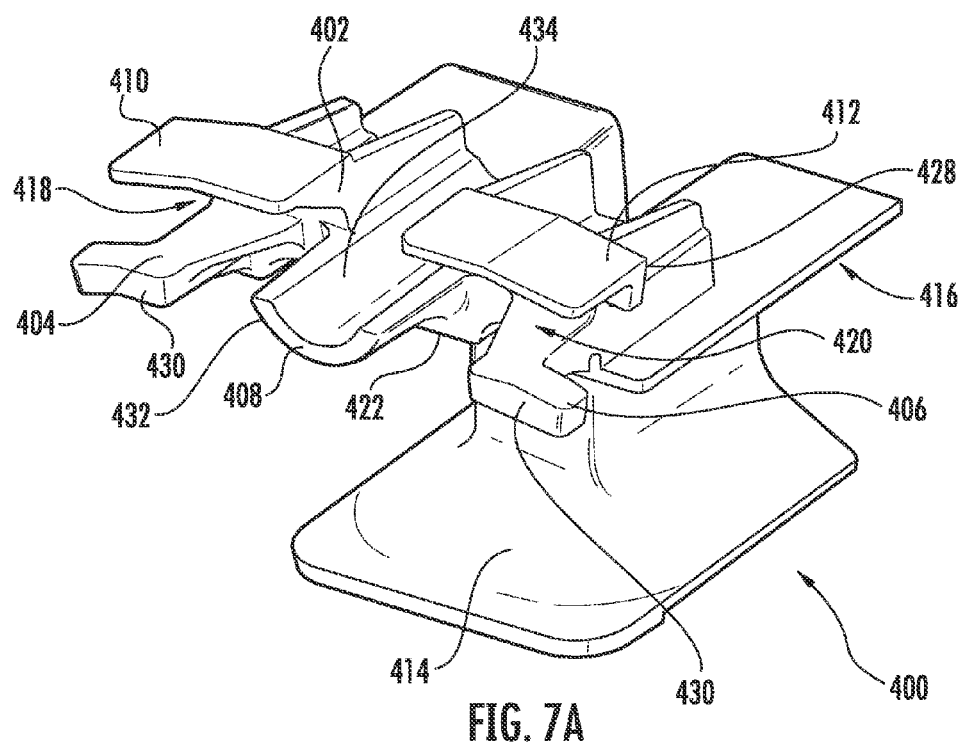
Figure 7B:
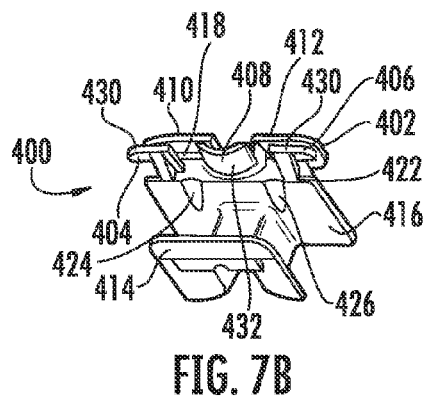
Figure 7C:
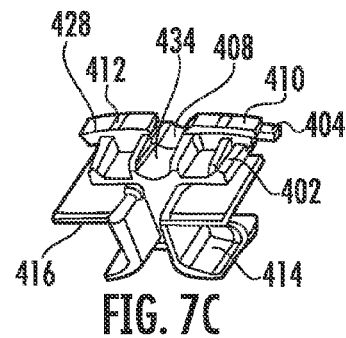
Figure 7D:
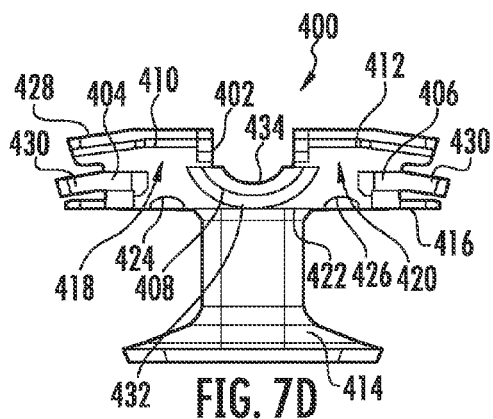
Figure 7E:
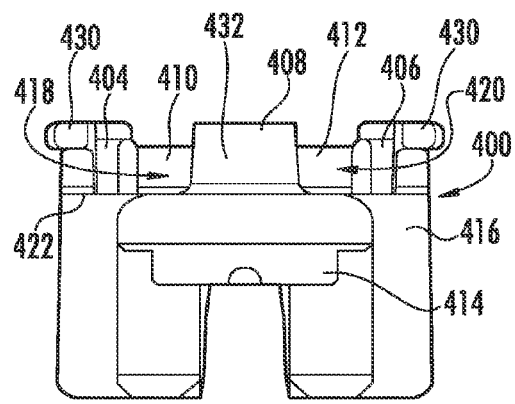
Figure 7F:
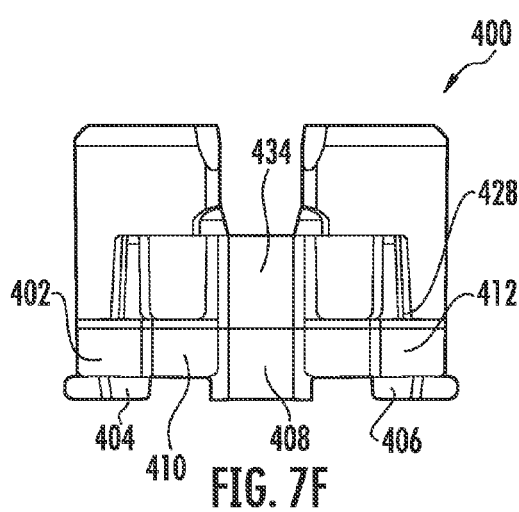
Figure 7G:
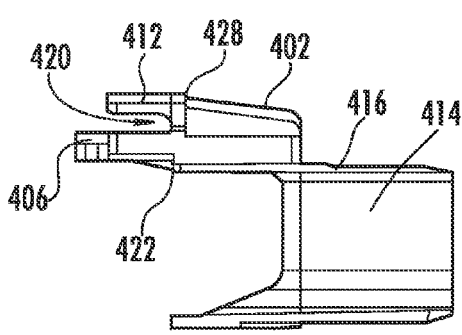
Figure 8:
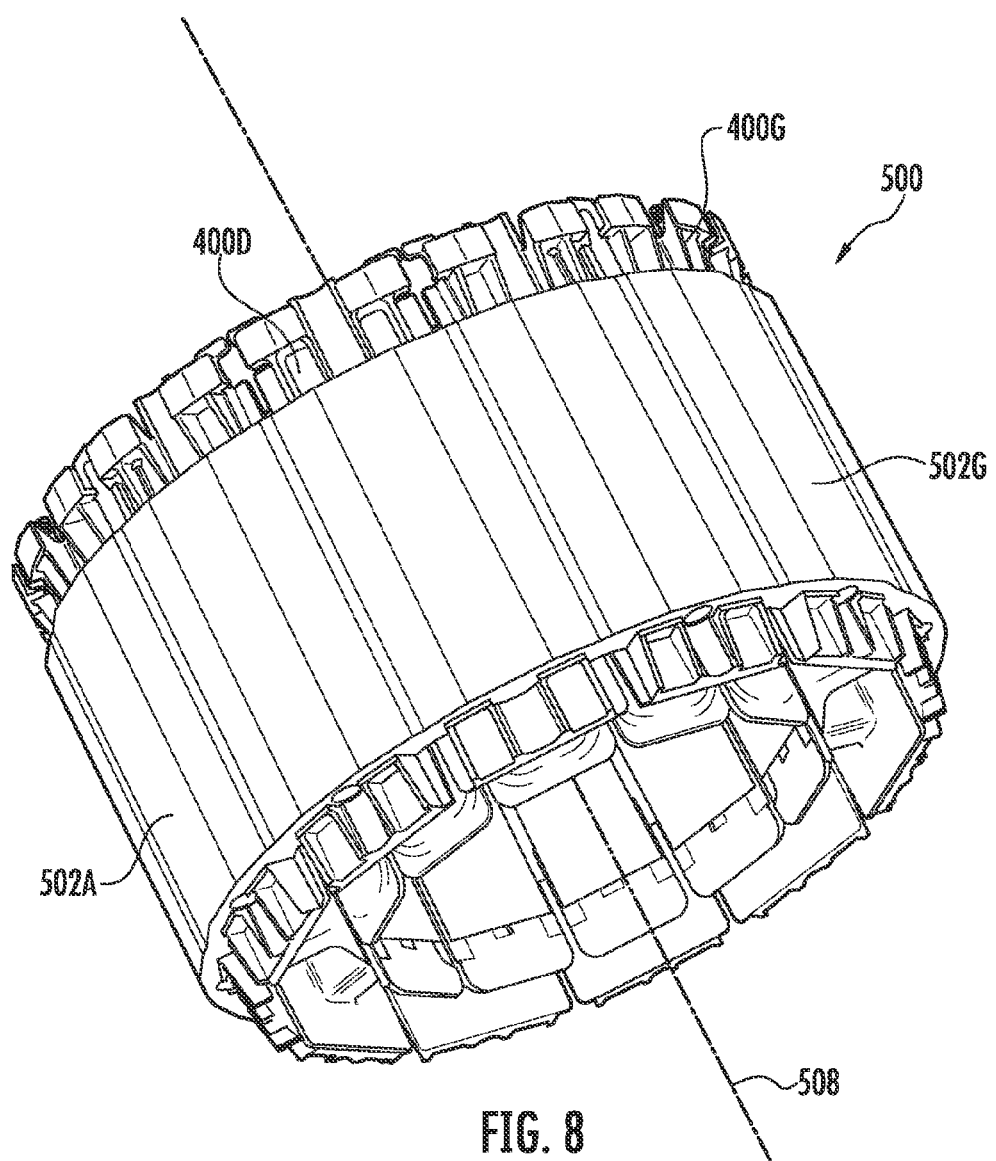

FIG. 8 is a perspective view of a stator assembly including end caps of the type shown in FIG. 7 according to another example embodiment.

Figure 9:
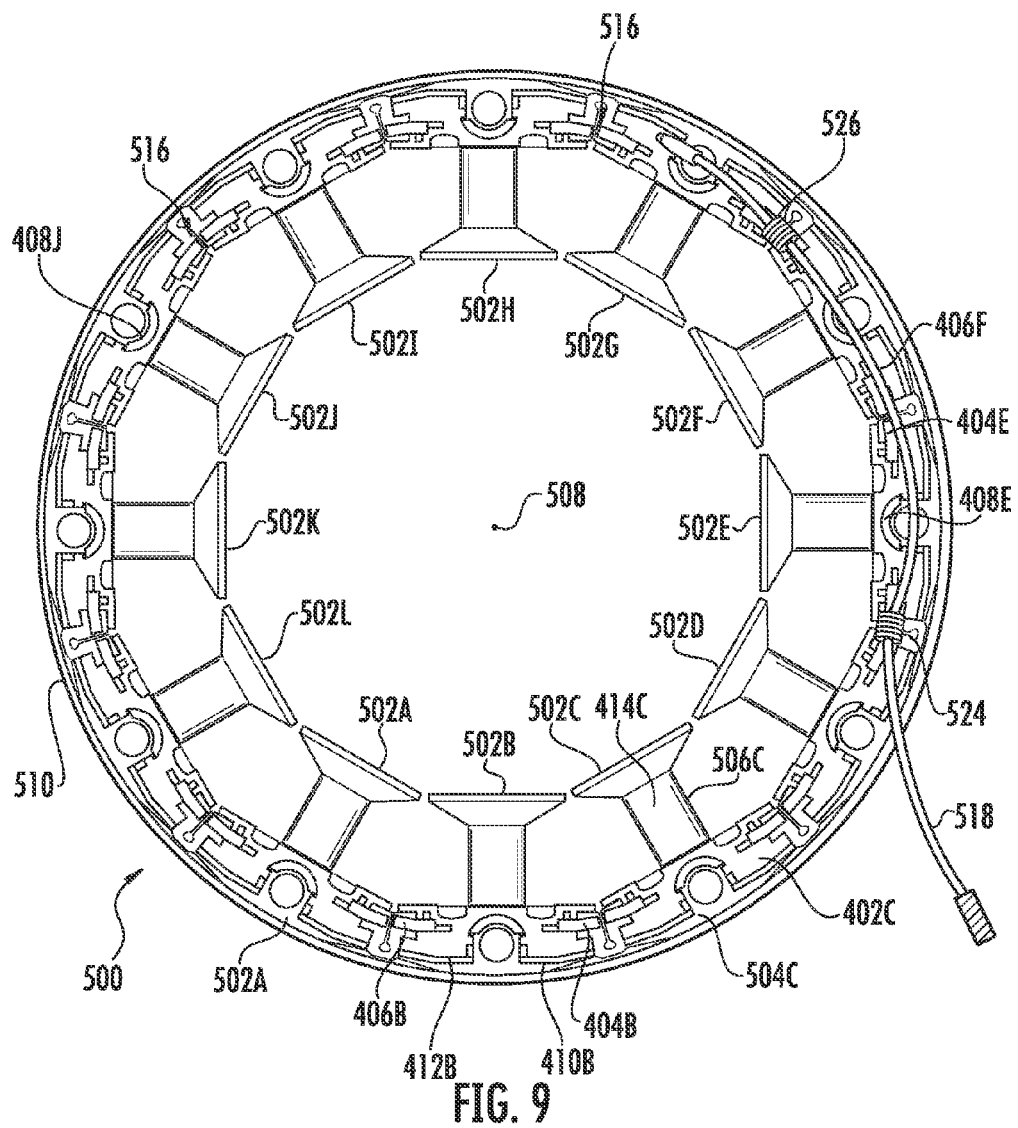

FIG. 9 is a plan view of the stator assembly of FIG. 8 with a stator shell.

Figure 10:
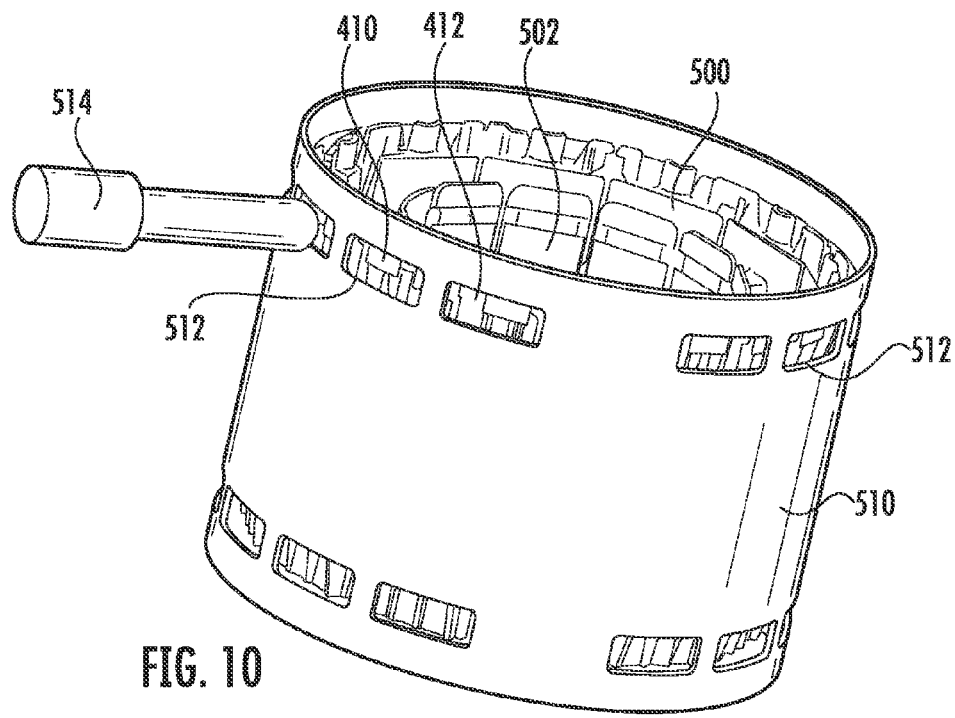

FIG. 10 is a perspective view of the stator assembly of FIG. 9.

Figure 11:
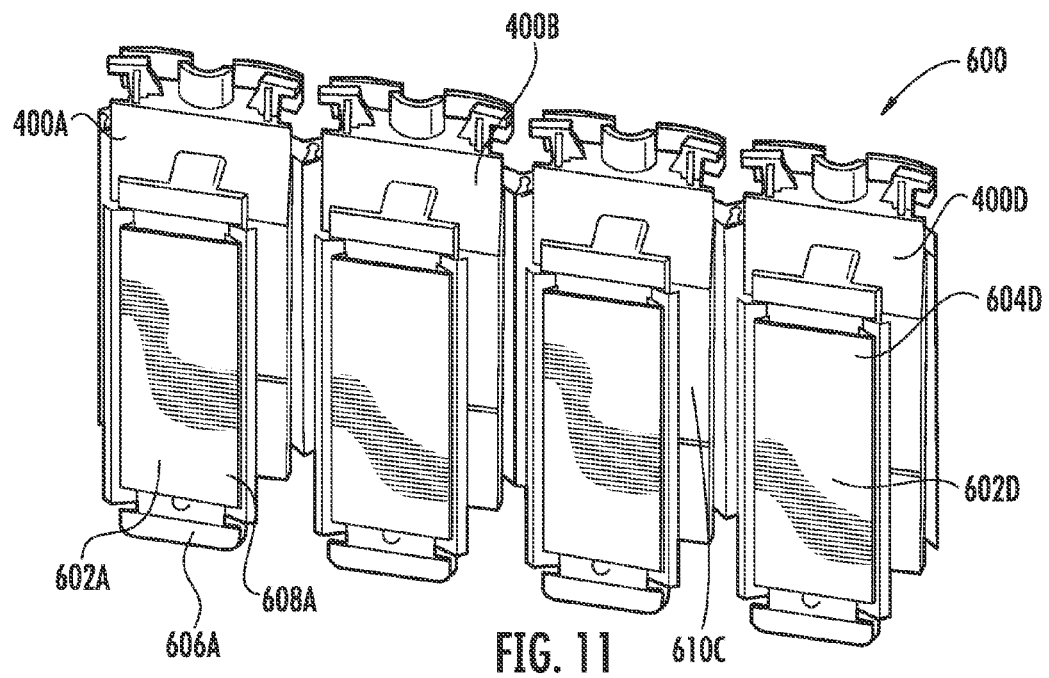

FIG. 11 is a perspective view of a stator assembly having multiple stator segments linearly disposed according to another example embodiment of the present disclosure.

Figure 12:
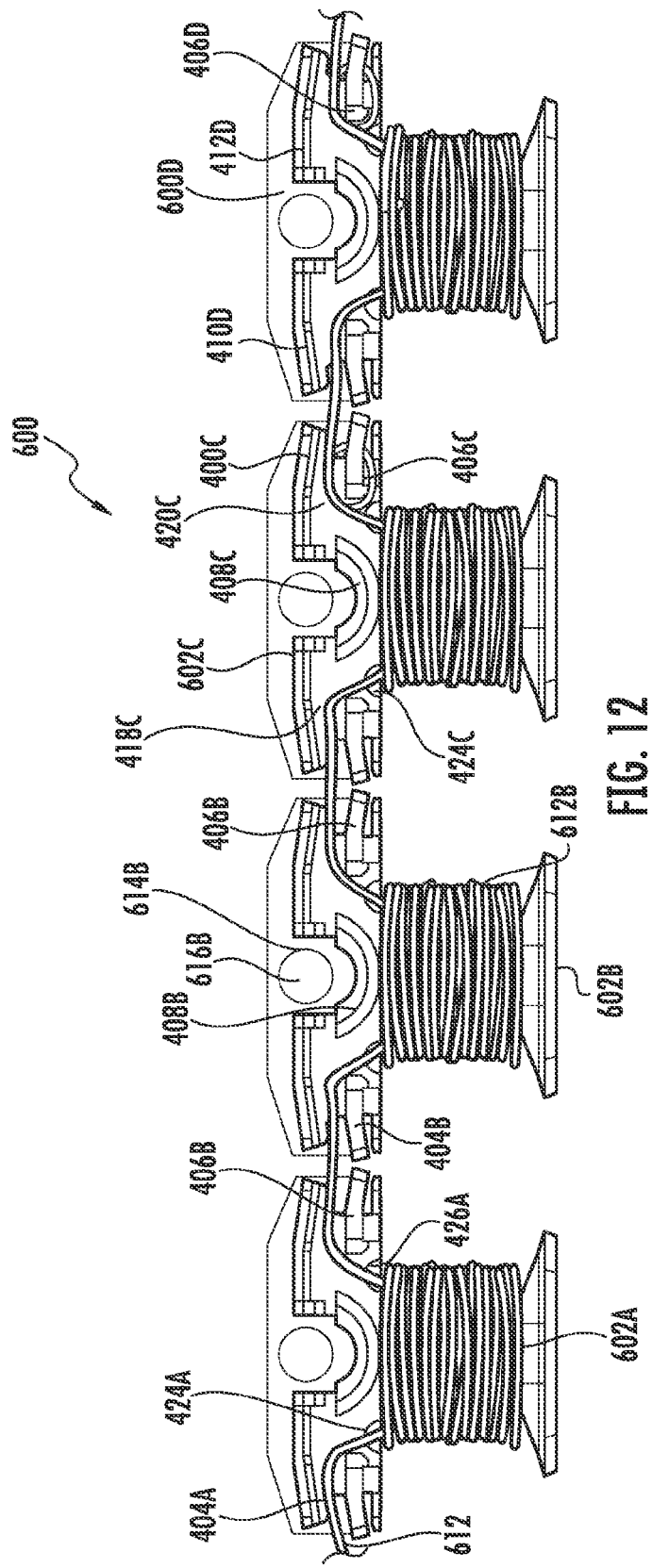

FIG. 12 is plan view of the stator assembly of FIG. 11 wound with magnet wire.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
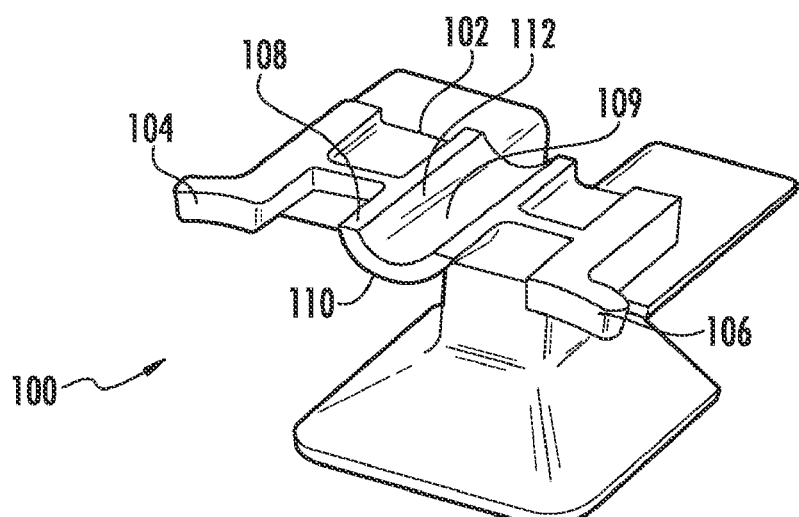
FIG. 1 is a perspective view of an end cap according to one example embodiment of the present disclosure.

FIG. 1 illustrates an end cap 100 according to one example embodiment of the present disclosure. The end cap 100 includes a body portion 102. The body portion 102 includes two posts 104, 106. The post 104 is disposed at one end of the body portion, and the post 106 is disposed at an opposite end of the body portion 102.

The body portion 102 further includes an arcuate member 108 having a concave side 109 and a convex side 110. The shape, size and position of the arcuate member 108 can be modified as desired for any given application of these teachings. For example, the side of the arcuate member 108 opposite the convex side 110 may be flat, such that a cross-section of the arcuate member 108 has a semicircular shape. Alternatively, the arcuate member 108 may be eliminated.

Further, although the example end cap 100 includes two posts 104, 106 and an arcuate member 108, it should be appreciated that, in various other embodiments, the end cap may include one or more posts but no arcuate member. Alternatively, the end cap may include an arcuate member but more or less than two posts (including no post).

Figure 2:
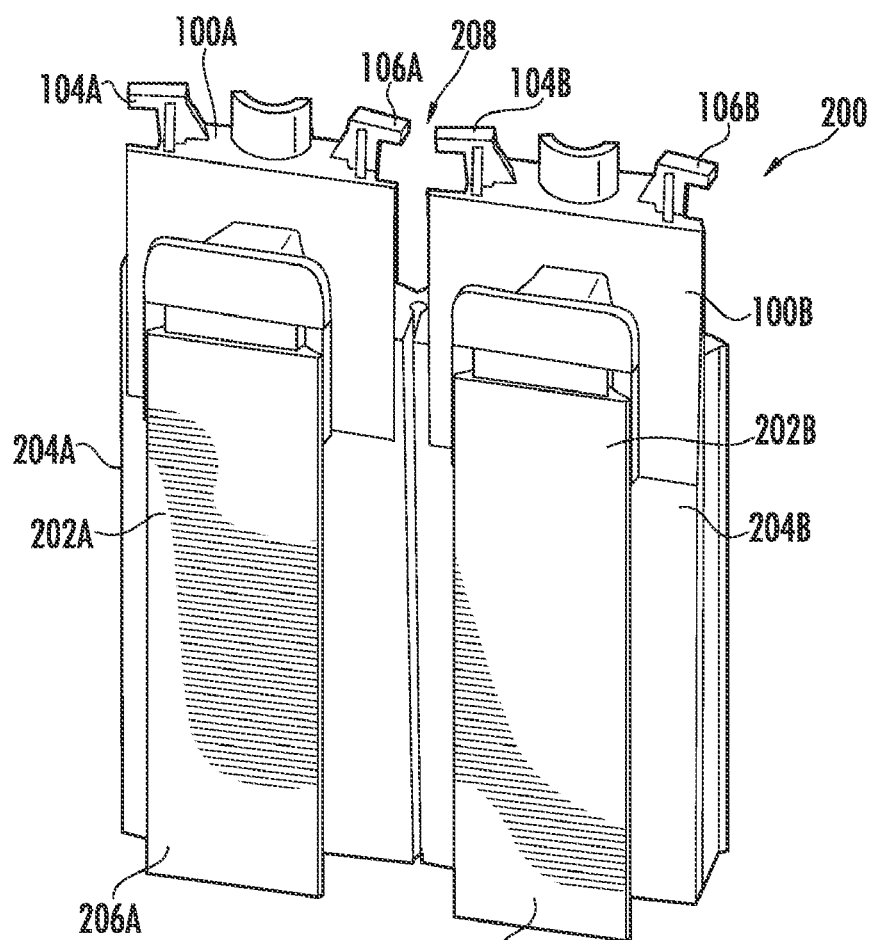
FIG. 2 is a perspective view of a stator assembly including the end cap of FIG. 1 according to another example embodiment.

FIG. 2 illustrates a stator assembly 200 including two like stator segments 202A, 202B according to another example embodiment. Each stator segment 202 has a yoke portion 204 and a tooth portion 206 extending from the yoke portion 204. The stator assembly 200 further includes two of the example end caps 100 shown in FIG. 1. The body portion 102 of each end cap 100 is positioned at least partially over the yoke portion 204 of its respective stator segment 202. The post 106A of end cap 100A cooperates with the post 104B of the adjacent end cap 100B to define a wire management tie-down 208.

Figure 3:
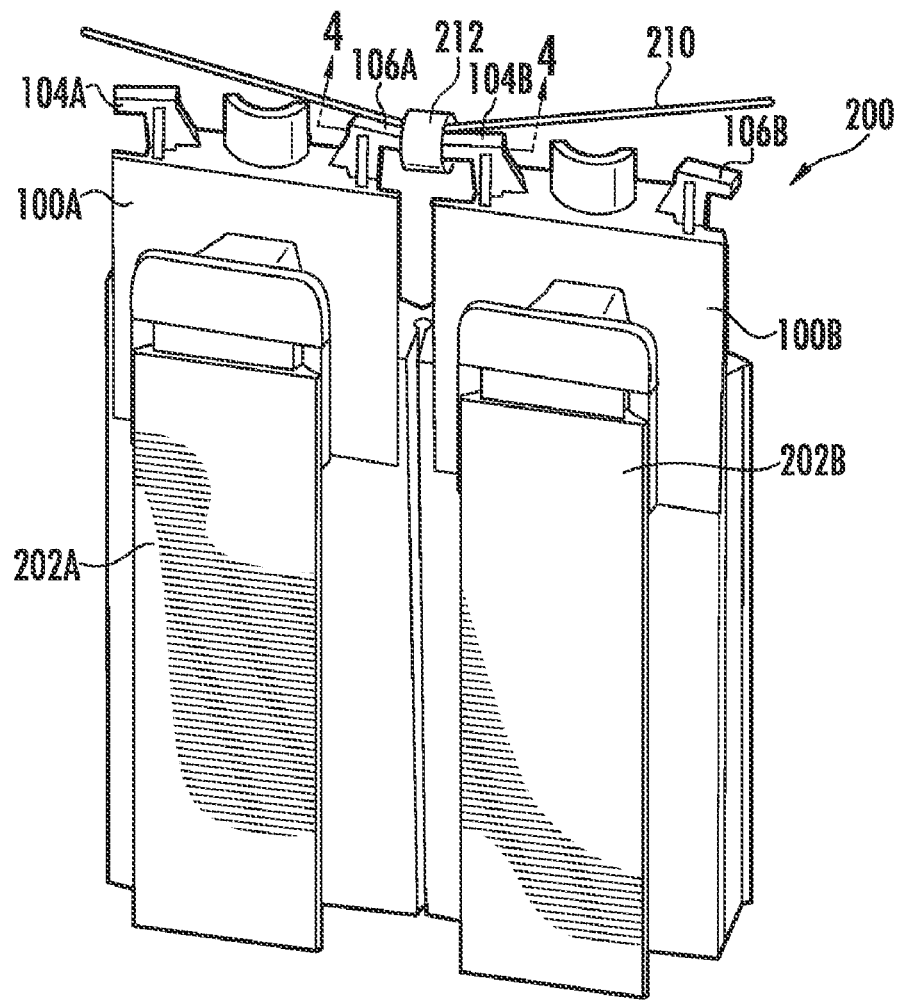
FIG. 3 is a perspective view of the stator assembly of FIG. 2 and a stator wire.

As shown in FIG. 3, a stator wire 210 may be coupled to the wire management tie-down 208 using a cable tie 212. Suitable cable ties include zip ties, string and other devices for coupling the stator wire 210 to the wire management tie-down 208. The stator wire 210 may be a magnet wire, a wire lead coupled to a magnet wire, or another wire associated with the stator assembly.

Each post may be structured in any suitable manner to cooperate with the post of an adjacent end cap. In the example embodiments shown in FIGS. 1-3, the posts 104, 106 are L-shaped. Alternatively, other shapes (e.g., I-shapes, T-shapes, Y-shapes, other L-shapes, etc.), sizes and/or positions of posts may be employed.

Figure 4:
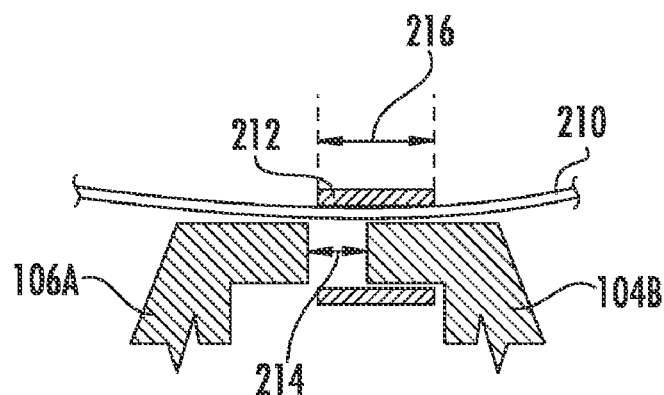
FIG. 4 is a partial cross-sectional view taken along Line 4-4 in FIG. 3.

The L-shaped posts 104B, 106A define a space 214 therebetween. As shown in the detailed view of FIG. 4, the space 214 between the posts 104B, 106A is less than a width 216 of the example cable tie 212. This inhibits the cable tie 212 from passing through the space 214. In other embodiments, adjacent posts may cooperate differently and define more or less space (including no space) therebetween. For example, a post may be configured to contact or otherwise engage a post of an adjacent end cap to define a wire management tie-down.

Figure 5:
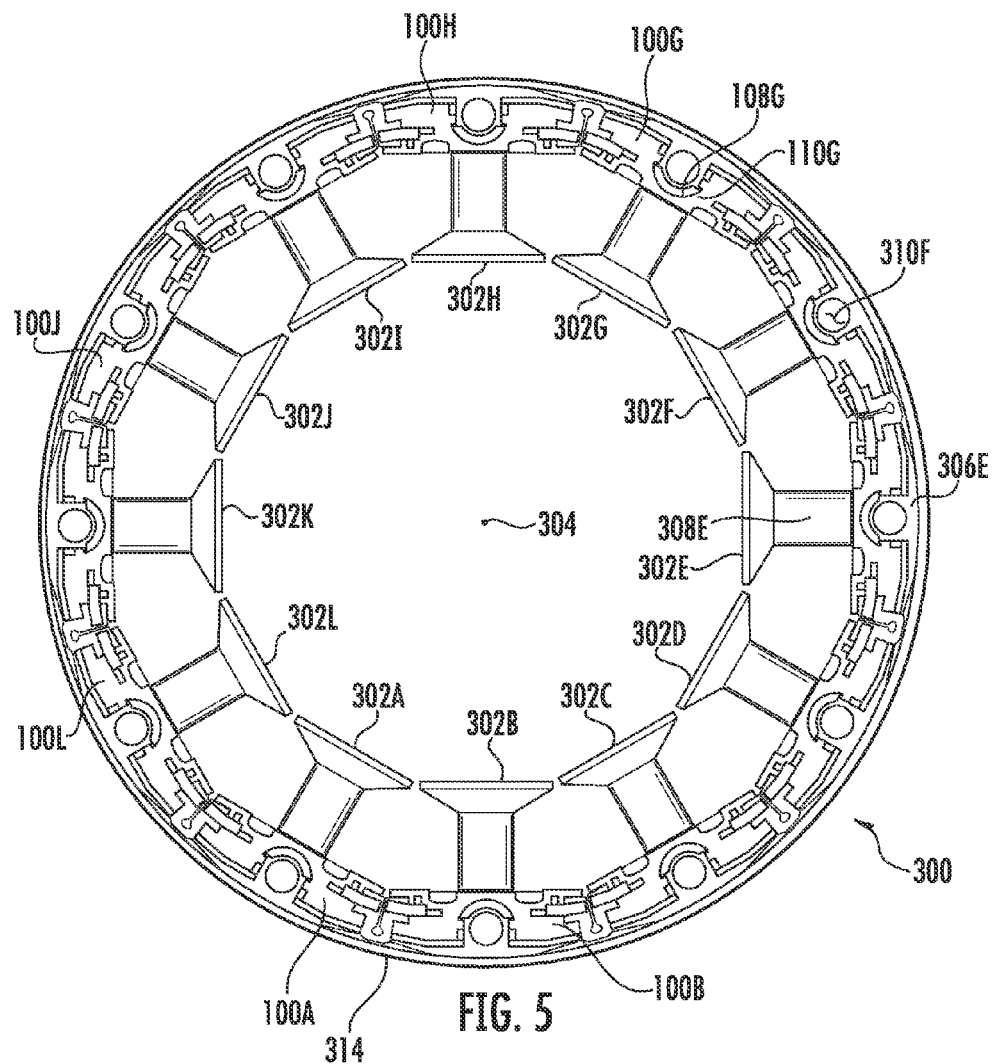
FIG. 5 is a plan view of a stator assembly including the end cap of FIG. 1 according to another example embodiment.

FIG. 5 illustrates a stator assembly 300 according to another example embodiment of the present disclosure. The stator assembly 300 includes multiple stator segments 302A-L and multiple end caps 100A-L of the type shown in FIG. 1. Each end cap 100 is positioned over one of the stator segments 302. As shown in FIG. 5, the stator segments 302 are annularly disposed and define a central axis 304 (extending into and out of the page in FIG. 5). The convex sides 110 of the arcuate members 108 face the central axis 304 defined by the stator segments 302, and the concave sides 109 of the arcuate members 108 face away from the central axis 304.

Figure 6:
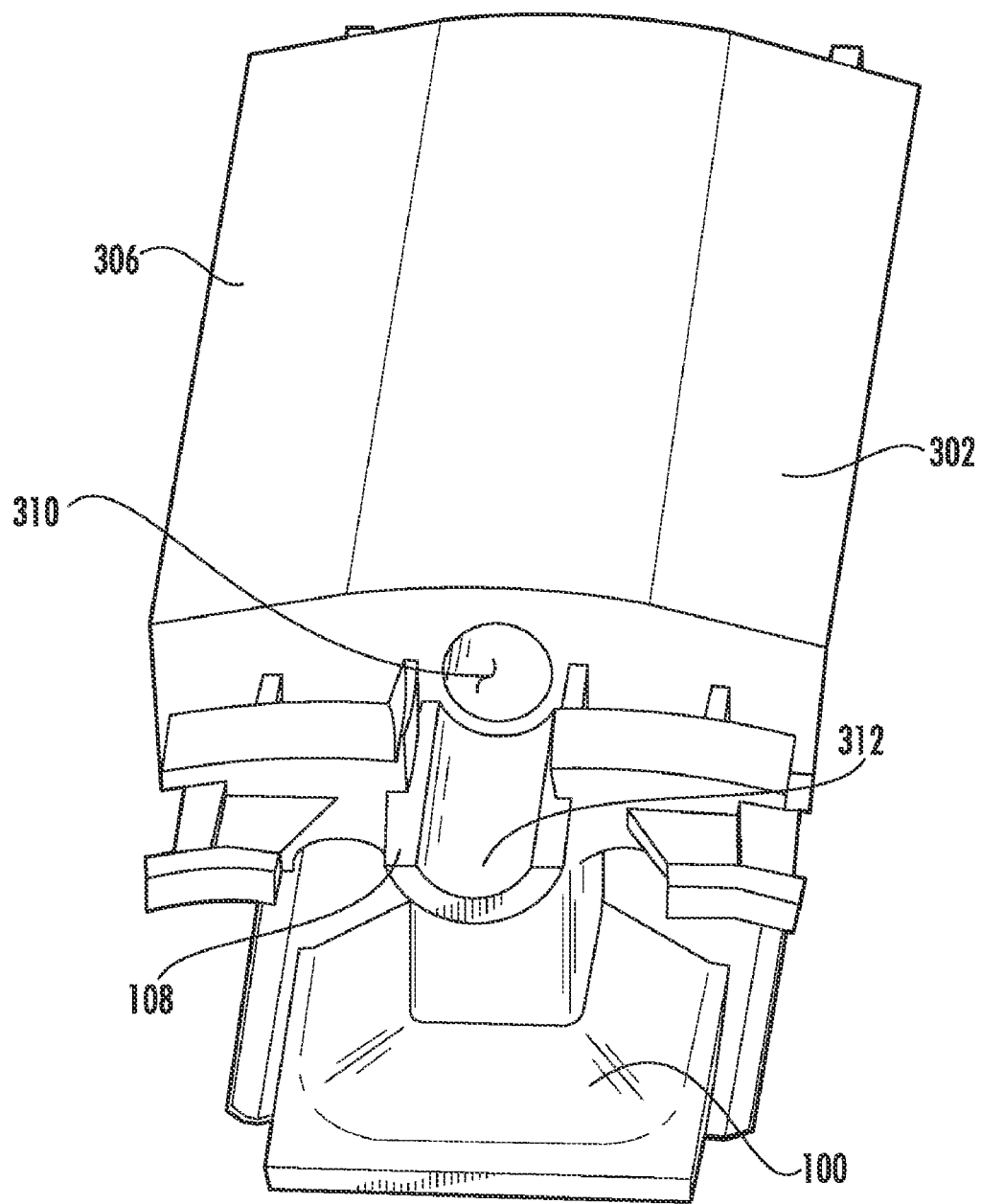
FIG. 6 is a perspective view of one of the stator segments and end caps of FIG. 5.

Each stator segment 302 includes a yoke portion 306 and a tooth portion 308. Each yoke portion 306 defines a fastener hole 310 to permit one or more of the stator segments 302 to be secured to a motor end shield, for example. As shown in the detailed view of FIG. 6, the arcuate member 108 defines a channel 312 that is substantially coextensive with the fastener hole 310 of the associated stator segment 302. In this manner, the arcuate member 108 may be useful during assembly, to guide a fastener through the fastener hole 310. For example, in some embodiments, before a fastener is passed through the fastener hole 310, the stator segments 302 are nested within a stator shell 314. An end shield is positioned over the end of the stator assembly 300 shown in FIG. 5, which obscures view of the fastener holes 310. Thus, the arcuate member 108 acts to at least partially guide a fastener, such as a stator bolt, screw, etc., into the fastener hole 310 of a stator segment 302.

In the example embodiment of FIG. 5, each arcuate member 108 is circumferentially aligned about the central axis 304 of the stator assembly 300, i.e., each arcuate member 108 is spaced the same radial distance from the central axis 304. Arcuate members having other sizes, shapes and/or positions may be employed in other embodiments to assist in manufacture of the stator assembly and/or an electric machine including the stator assembly, or for other reasons.

FIGS. 7A-G illustrate an end cap 400 according to another example embodiment of the present disclosure. The end cap 400 includes a body portion 402 having two posts 404, 406, an arcuate member 408 and two wall segments 410, 412. The body portion 402 includes an inner surface 416, and the end cap 400 includes a winding portion 414 extending from the inner surface 416. In this particular embodiment, the end cap 400 is symmetrical such that the right side of the end cap is a mirror image of the left side of the end cap. Alternatively, an asymmetrical configuration may be employed. For example, the end cap may have an I-shaped post on one side and an L-shaped post on another side, or an L-shaped post on one end and no post on an opposite end, etc.

As best shown in FIG. 7D, the wall segment 410 and the post 404 form a wire trough 418 therebetween. Similarly, the wall segment 412 and the post 406 form a wire trough 420 therebetween. The wire troughs 418, 420 permit routing of magnet wire along the end cap 400 and/or between multiple adjacent end caps. Additionally, the inner surface 416 of the body portion has a top edge 422 and defines pockets 424, 426. The pockets 424, 426 extend downwardly from the top edge 422. One or both of the pockets 424, 426 may be used to guide magnet wire to or from the tooth portion of a stator segment on which the end cap 400 is positioned.

In the example embodiment shown in FIGS. 7A-7G, the body portion 402 defines an outer edge 428. The wall segments 410, 412 are each disposed along the outer edge 428 of the body portion 402. In this manner, the wall segments 410, 412 inhibit magnet wire, routed through the wire troughs 418, 420, from moving beyond the outer edge 428 of the body portion 402. Alternatively, the wall segments may be offset from the outer edge of the body portion. Moreover, it should be understood that each of the wall segments 410, 412 and pockets 424, 426 may be employed alone and/or with a post and/or an arcuate member, or omitted, in other embodiments of the present disclosure.

FIGS. 8-9 illustrate a stator assembly 500 according to another example embodiment of the present disclosure. The stator assembly 500 includes a plurality of annularly disposed stator segments 502A-L. Each of the stator segments 502 includes a yoke portion 504 and a tooth portion 506 extending from the yoke portion 502. The annularly disposed stator segments 502 define a central axis 508.

The stator assembly 500 also includes a plurality of like end caps 400A-L of the type shown in FIGS. 7A-7L. As shown in FIG. 9, each body portion 402 is positioned at least partially over the yoke portion 504 of its associated stator segment 502, and each winding portion 414 is positioned at least partially over the tooth portion 506 of its associated stator segment 502. While like end caps 400A-L are included in the stator assembly 500, it should be appreciated that a variety of end caps having different configurations can also be employed without departing from the scope of this disclosure.

In the example embodiment of FIGS. 8-9, the posts 404, 406 of the end caps 400 are substantially circumferentially aligned with one another about the central axis 508 (i.e., all of the posts 404, 406 are spaced the same distance from the central axis 508). One or more posts may be aligned otherwise, or not at all, in other embodiments. As best shown in FIG. 7D, the posts 404, 406 each include a bent segment 430. Referring again to FIG. 9, the bent segments 430 of the posts 404, 406 are also substantially circumferentially aligned with one another about the central axis 508. Additionally, the arcuate members 408 of the end caps 400 are circumferentially aligned with one another about the central axis 508, and circumferentially aligned with the posts 404, 406.

As shown in FIG. 9, the wall segments 410, 412 are spaced radially outwardly from the posts 404, 406. The wall segments 410, 412 are also circumferentially aligned with one another about the central axis 508. In various embodiments, the positions of the wall segments 410, 412 may be based on the position of vent holes, if any, in a stator shell included in the stator assembly 500. FIG. 10, for example, illustrates the stator assembly 500 including a stator shell 514 positioned around the stator segments 502A-L. The stator shell 514 includes a plurality of vent holes 512. The wall segments 410, 412 are positioned adjacent to the vent holes 512 to inhibit the insertion of a foreign object 514, such as a tool or a body part, through the vent holes 512. In this manner, the wall segments 410, 412 can inhibit the foreign object 514 from contacting (and potentially shorting) one or more wires within the stator assembly 500. Alternatively, one or more of the wall segments may have a different size, shape or position, or may be omitted (as in the example embodiment of FIG. 1), especially when an unvented stator shell is employed.

With further reference to FIG. 9, posts 404 and posts 406 of adjacent end caps form multiple wire management tie-downs 516. The stator assembly 500 includes a lead wire 518, which is coupled to one end of a magnet wire (not shown). The lead wire is routed along the yoke portions 504 of the stator segments 502, and adjacent to multiple wire management tie-downs 516. The lead wire 518 is coupled to two wire management tie-downs 516, via cable ties 524, 526. Of course, additional lead wires and/or cable ties may also be employed.

The end caps 400 (and other end caps disclosed herein) may be used in a wide variety of stator assemblies and are particularly suited for chain wound stator assemblies. FIG. 11 illustrates another example stator assembly 600 employing the end caps 400 and suitable for chain winding. The stator assembly 600 includes a plurality of linearly disposed stator segments 602A-D. Each stator segment 602 has a lead (or top) end 604, a base (or bottom) end 608 and an intermediate section 610 extending therebetween. End caps 400 are positioned on the lead ends 604, and end caps 606 are positioned on the base ends 608. The intermediate sections 610 are insulated (e.g., with Mylar or otherwise). Together, the lead end caps 400, the base end caps 606 and the insulated intermediate sections 610 insulate the tooth portions of the stator segments 602 from magnet wire wound thereon.

As shown in FIG. 12, magnet wire 612 is wound on each of the stator segments 602A-D. The magnet wire 612 may be one continuous magnet wire wound around multiple stator segments. For example, a three phase stator assembly may include three magnet wires wound about twelve stator segments (A-L). A first continuous magnet wire (i.e., the first phase wire) may be wound about stator segments A, B, G and H, a second continuous magnet wire (i.e., the second phase wire) may be wound about stator segments C, D, I, J, and a third continuous magnet wire (i.e., the third phase wire) may be wound about stator segments E, F, K, L. As should be apparent, however, different numbers of stators segments and/or winding patterns (using continuous or discontinuous magnet wires) may be employed in any given application of these teachings.

In the example embodiment shown in FIG. 12, the magnet wire 612 is routed via the posts 404, 406, the arcuate members 408, the pockets 424, 426 and the wall segments 410, 412. The magnet wire 612 extends along the convex sides 432, and not along the concave sides 434, of the arcuate members 408. In this manner, the magnet wire 612 is inhibited from entering a channel 614 defined by the arcuate member 408 over the fastener hole 616 of each stator segment 602. This protects the magnet wire 612 from damage by a fastener and/or inhibits interference with insertion of fasteners into the fastener holes 616 of the stator segments 602.

Magnet wire 612 extending to or from a tooth portion on one of the stator segments 602 extends at least partially through one or more of the pockets 424, 426. The pockets 424, 426 inhibit lateral movement of the magnet wire 612 therein to provide tension in the magnet wire 612 during winding of the stator segments 602. The magnet wire 612 may also be wrapped around one or more of the posts (e.g., posts 406C, 406D in FIG. 12) to provide tension in routing the magnet wire 612 to an adjacent stator segment 602 and/or about the tooth portions of stator segments 602.

Additionally, magnet wire 612 is routed in the wire troughs 418, 420, defined between the posts 404, 406 and the wall segments 410, 412. The end cap features described above permit routing to be precisely controlled during winding of the magnet wire 612 onto the stator segments 602, for example, by an automated process. Further, after the stator assembly 600 is wound with magnet wire 612, the linearly disposed stators segments 602 are formed into an annual arrangement, for example, as shown in FIG. 9. As the stator segments are formed, the magnet wire 612 wound on the stator segments 602 is retained in substantially the same location by one or more of the posts 404, 406, the arcuate members 408, the wall segments 410, 412, and the pockets 424, 426.

Stator assemblies incorporating one or more of the aspects disclosed herein may be used in a variety of electric machines including electric motors and generators. For example, the stator assembly 500 shown in FIGS. 8-9 may be employed in a DC brushless motor.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A segmented stator assembly comprising:
a plurality of stator segments, each stator segment having a yoke portion and a tooth portion extending from the yoke portion;
a plurality of end caps, each end cap positioned over one of the stator segments, each end cap including a body portion positioned at least partially over the yoke portion of its associated stator segment, at least one of the body portions including at least a first post that cooperates with a post of an adjacent end cap to define a first wire management tie-down;
a stator wire coupled to the first wire management tie-down; and
a cable tie coupling the stator wire to the first wire management tie-down.

2. The stator assembly of claim 1 wherein the first post and the post of the adjacent end cap define a space therebetween that is less than a width of the cable tie.

3. The stator assembly of claim 1 wherein said at least one body portion further includes a second post that cooperates with a post of another adjacent end cap to define a second wire management tie-down.

4. A segmented stator assembly comprising:
a plurality of stator segments, each stator segment having a yoke portion and a tooth portion extending from the yoke portion;
a plurality of end caps, each end cap positioned over one of the stator segments, each end cap including a body portion positioned at least partially over the yoke portion of its associated stator segment, at least one of the body portions including at least a first post that cooperates with a post of an adjacent end cap to define a first wire management tie-down; and
a stator wire coupled to the first wire management tie-down,
wherein said at least one body portion further includes a second post that cooperates with a post of another adjacent end cap to define a second wire management tie-down,
wherein the first post is L-shaped and the second post is L-shaped.

5. The stator assembly of claim 4 wherein the plurality of stator segments are annularly disposed and define a central axis, and wherein the first and second posts include curved segments that are circumferentially aligned with one another.

6. A segmented stator assembly comprising:
a plurality of stator segments, each stator segment having a yoke portion and a tooth portion extending from the yoke portion;
a plurality of end caps, each end cap positioned over one of the stator segments, each end cap including a body portion positioned at least partially over the yoke portion of its associated stator segment, at least one of the body portions including at least a first post that cooperates with a post of an adjacent end cap to define a first wire management tie-down; and
a stator wire coupled to the first wire management tie-down,
wherein said at least one body portion further includes a wall segment spaced radially outwardly from the first post, and wherein the wall segment and the first post define a wire trough therebetween for routing magnet wire.

7. The stator assembly of claim 6 wherein the plurality of end caps are substantially identical.

8. The stator assembly of claim 6 wherein the stator wire is a lead wire coupled to a magnet wire, and the magnet wire is wound about at least two of the stator segments.

9. An electric machine comprising the stator assembly of claim 6.

10. The stator assembly of claim 6 wherein the end cap includes a winding portion, the body portion includes an inner surface facing the tooth portion, the winding portion extends from the inner surface, and the inner surface of at least one of the body portions has a top edge and defines at least a first pocket extending from the top edge toward the winding portion;

further comprising a magnet wire wound about the tooth portion of at least one of the stator segments, the magnet wire at least partially extending through the first pocket.

11. A segmented stator assembly comprising:
a plurality of stator segments, each stator segment having a yoke portion and a tooth portion extending from the yoke portion;
a plurality of end caps, each end cap positioned over one of the stator segments, each end cap including a body portion positioned at least partially over the yoke portion of its associated stator segment, at least one of the body portions including at least a first post that cooperates with a post of an adjacent end cap to define a first wire management tie-down; and
a stator wire coupled to the first wire management tie-down,
wherein the plurality of stator segments are annularly disposed about a central axis, wherein said at least one body portion includes an arcuate member positioned over the yoke portion, and wherein the arcuate member has a convex side facing the central axis.

12. The stator assembly of claim 11 wherein the first post, the post of the adjacent end cap, and the arcuate member are circumferentially aligned with one another.

13. The stator assembly of claim 11 wherein said at least one body portion further includes a wall segment spaced radially outwardly from the first post, and wherein the wall segment and the first post define a wire trough therebetween for routing magnet wire.

14. A segmented stator assembly comprising:
a plurality of stator segments, each stator segment having a yoke portion and a tooth portion extending from the yoke portion;
a plurality of end caps, each end cap positioned over one of the stator segments, each end cap including a body portion positioned at least partially over the yoke portion of its associated stator segment, at least one of the body portions including at least a first post that cooperates with a post of an adjacent end cap to define a first wire management tie-down;
a stator wire coupled to the first wire management tie-down,
wherein the end cap includes a winding portion, the body portion includes an inner surface facing the tooth portion, the winding portion extends from the inner surface, and the inner surface of at least one of the body portions has a top edge and defines at least a first pocket extending from the top edge toward the winding portion; and
a magnet wire wound about the tooth portion of at least one of the stator segments, the magnet wire at least partially extending through the first pocket,
wherein the plurality of stator segments are annularly disposed about a central axis and said at least one body portion includes an arcuate member having a convex side facing the center axis.

15. The stator assembly of claim 14 wherein the inner surface of said at least one body portion further defines a second pocket extending from the top edge toward the winding portion, wherein the first pocket is disposed on one side of the arcuate member, and wherein the second pocket is disposed on an opposite side of the arcuate member.

16. The stator assembly of claim 15 wherein said at least one body portion further includes a wall segment spaced radially outwardly from the post, and wherein the wall segment and the post define a wire trough therebetween for routing magnet wire.

17. An electric machine comprising the stator assembly of claim 16.

18. A segmented stator assembly comprising:
a plurality of stator segments, each stator segment having a yoke portion and a tooth portion extending from the yoke portion, the plurality of stator segments being annularly disposed and defining a central axis; and
a plurality of end caps, each end cap positioned over one of the stator segments, each end cap including a body portion positioned at least partially over the yoke portion of its associated stator segment, at least one of the body portions including an arcuate member having a convex side facing the central axis defined by the plurality of stator segments, further comprising a magnet wire wound about the tooth portion of at least one of the stator segments, wherein the arcuate member has a concave side facing away from the central axis, and wherein the magnet wire extends along the convex side of the arcuate member but not on the concave side of the arcuate member,
wherein each of the yoke portions includes a fastener hole, and wherein the arcuate member includes a concave side defining a vertical channel substantially coextensive with the fastener hole of its associated stator segment.

19. The stator assembly of claim 18 wherein said at least one body portion defines an outer edge and includes a wall segment disposed at least partially along the outer edge, and the wall segment is positioned to inhibit movement of a magnet wire beyond said outer edge.

20. An electric machine comprising the stator assembly of claim 19.

21. The stator assembly of claim 19 further comprising a magnet wire wound about the tooth portion of at least one of the stator segments, wherein said at least one body portion includes an inner surface having a pocket, the magnet wire at least partially extending through the pocket.

22. The stator assembly of claim 18 wherein each end cap is substantially identical.

23. A segmented stator assembly comprising:
a plurality of stator segments, each stator segment having a yoke portion and a tooth portion extending from the yoke portion, the plurality of stator segments being annularly disposed and defining a central axis;
a plurality of end caps, each end cap positioned over one of the stator segments, each end cap including a body portion positioned at least partially over the yoke portion of its associated stator segment, at least one of the body portions including an arcuate member having a convex side facing the central axis defined by the plurality of stator segments, further comprising a magnet wire wound about the tooth portion of at least one of the stator segments, wherein the arcuate member has a concave side facing away from the central axis, and wherein the magnet wire extends along the convex side of the arcuate member but not on the concave side of the arcuate member; and
a magnet wire wound about the tooth portion of at least one of the stator segments, wherein the arcuate member has a concave side facing away from the central axis, and wherein the magnet wire extends along the convex side of the arcuate member but not on the concave side of the arcuate member.

* * * * *